United States Patent
Wacker

[11] Patent Number: 5,346,128
[45] Date of Patent: Sep. 13, 1994

[54] HUMIDITY CONTROL SYSTEM

[75] Inventor: Paul C. Wacker, Hennepin County, Minn.

[73] Assignee: Honeywell Inc., Minneapolis, Minn.

[21] Appl. No.: 94,741

[22] Filed: Jul. 22, 1993

[51] Int. Cl.$^5$ ............................................. B01F 3/02
[52] U.S. Cl. ................................. 236/44 A; 165/21
[58] Field of Search ............... 165/20, 21; 236/44 R, 236/44 A; 126/113

[56] References Cited

U.S. PATENT DOCUMENTS

| | | | |
|---|---|---|---|
| 3,957,200 | 5/1976 | Young | 236/44 R |
| 4,161,660 | 7/1979 | Gallant | 307/118 |
| 4,262,491 | 4/1981 | Chorey et al. | 62/185 |
| 4,312,891 | 1/1982 | Cotton, Jr. | 236/44 A |
| 4,350,286 | 9/1982 | Sutoh et al. | 236/44 A |
| 4,361,273 | 11/1982 | Levine et al. | 236/11 |
| 4,430,698 | 2/1984 | Harris | 364/162 |
| 4,572,428 | 2/1986 | Groff et al. | 165/20 X |
| 4,721,448 | 1/1988 | Irish et al. | 425/144 |

*Primary Examiner*—William E. Wayner
*Attorney, Agent, or Firm*—Edward Schwarz

[57] ABSTRACT

A humidity control system for a space receiving conditioned air from a duct has sensors which measure the current humidity in both the space and the duct. The system calculates a duct set point based on the difference between the current space humidity and the humidity set point for the space. The system then controls the humidity of the air passing through the duct so as to both minimize the difference between the space humidity and the humidity set point for the space and to prevent the air in the duct from reaching its dew point. A special algorithm is used to compensate for lag in the duct's humidity sensor.

10 Claims, 2 Drawing Sheets

HUMIDITY CONTROL SYSTEM

BACKGROUND OF THE INVENTION

One of the factors for providing a comfortable indoor climate is control of humidity. While humidity does not have to be controlled with the accuracy with which temperature is controlled, it is still important that it be kept within the range of approximately 30-70% RH to prevent various problems. For example, if the relative humidity falls below 30%, furniture in the controlled space may deteriorate and some people have respiratory and skin problems. If the relative humidity rises to above 70%, the space seems clammy and uncomfortable, and there is the possibility of mildew.

Where humidity must be added to the air supplied to the space to raise the humidity to within the 30-70% range, it is also important that the duct humidity be held below the dew point, or 100% RH. If the humidity reaches this level, then condensation can occur in the duct which will cause rust and potentially require premature replacement. Even more importantly, high duct humidity can result in growth of microorganisms which can cause potentially dangerous diseases for the occupants of the space. To prevent excessive duct humidity, it has become standard practice to include a humidity sensor in the duct, and use its output to limit duct humidity to below the dew point.

In the past, space humidity has been controlled in much the same manner as has space temperature. A humidity sensor in the controlled space provides feedback to the humidity control apparatus, and the humidity in the supplied air is then altered so as to shift the space humidity toward the set point value. However, it has been difficult to accurately control humidity in the controlled space with this control algorithm for a number of reasons. These are, in no particular order, that humidity sensors now in use react slowly to changes in humidity, which results in unstable control. The actual humidity of the space does not always change predictably in response to changes in the humidity of the supplied air. And the necessity of limiting duct humidity to less than the dew point affects the operation of control algorithms based on the space humidity.

BRIEF DESCRIPTION OF THE INVENTION

Figure 1:
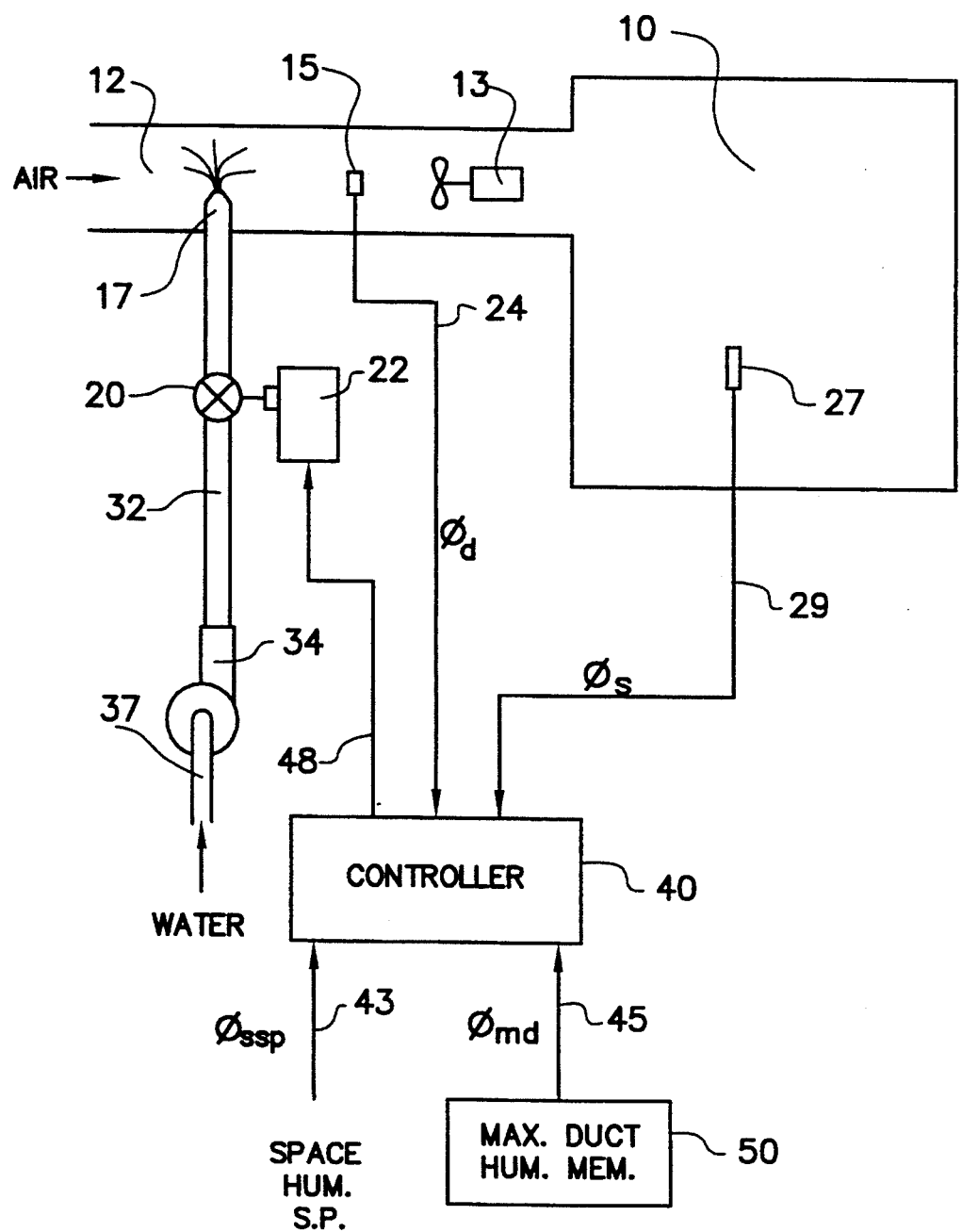
FIG. 1 is a block diagram of a humidity control system which employs the invention.

The problems of controlling the humidity in a space receiving replacement air from a duct are in large part avoided in a control system which calculates a duct humidity set point as a function of the space humidity error. The control loop then attempts to minimize the duct humidity error.

The space includes a humidity sensor providing a space humidity signal encoding a value representing the space humidity. The duct includes humidity control apparatus for variably changing the humidity of the air passing through the duct to a level which is a function of the value encoded in a variable humidity demand signal.

There is mounted in the duct, a duct humidity sensor having i) a sensing element mounted in the duct downstream from the humidity control apparatus and providing a sensor signal encoding a sensor value following the current duct humidity, and ii) duct humidity signal means receiving the sensor signal. The duct humidity signal means provides a duct humidity signal encoding a duct humidity value dependent on the sensor value and which approximates the current value of the duct humidity.

A first calculator means records a space humidity set point value which is typically either preset at the factory or may be entered during installation or by the user. The calculator means receives the space humidity signal, and provides a space humidity error signal encoding a space humidity error value equal to the difference between the space humidity value and the space humidity set point value.

A memory means issues a duct humidity limit signal encoding a preselected maximum duct humidity value, which typically will be slightly less than 100% RH.

A second calculator means receives the space humidity error signal and the duct humidity limit signal and calculates a duct humidity set point value as a function of the space humidity error value, which is less than the duct humidity maximum value. The second calculator means issues a duct humidity set point signal encoding the duct humidity set point value.

Modulator means receive the duct humidity set point signal and the duct humidity signal and provide a humidity demand signal having a value responsive to the difference between the duct humidity set point value and the duct humidity value encoded in the duct humidity signal.

One factor that is important for the proper operation of this system involves the relatively slow response of currently available humidity sensors. These sensors cannot provide a signal which accurately follows rapidly changing humidity in the surrounding air. To deal with this problem, I have developed an algorithm which allows calculation of a prediction of the actual ambient humidity which is more accurate than that inherent in the sensor signal itself. The duct humidity signal means includes prediction means receiving the sensor signal which calculate a predicted current duct humidity value based on the sensor signal and known characteristics of the sensor, and which issue a duct humidity signal encoding a predicted current duct humidity value.

There is also a preferred algorithm for controlling the humidity control apparatus. Use of this algorithm requires humidity control apparatus which can continuously increase the rate at which water is injected into the air passing through the duct responsive to a first value of the humidity demand signal, holds constant the rate at which water is injected into the air passing through the duct responsive to a second value of the humidity demand signal, and reduce the rate at which water is injected into the air passing through the duct responsive to a third value of the humidity signal. The modulation means further comprises means receiving the duct humidity signal and providing a humidity demand signal having these first through third values with durations which are a function of the duct humidity value.

DESCRIPTION OF THE PREFERRED EMBODIMENT

The system of FIG. 1 is intended to control the humidity of an enclosed space 10 which receives conditioned air from a duct 12. Air is drawn into duct 12 by a fan 13 and forced into space 10. Vents not shown allow air within the space 10 to escape as air is added from duct 12. A space humidity sensor 27 provides on path 29, a space humidity signal which encodes a value $\phi_s$ representing the humidity of space 10. Typically the humidity parameter which is used in these measurements is relative humidity, and that will be assumed for the remainder of this description, although it is also possible to use absolute humidity or dew point as the humidity parameter.

Humidity in space 10 is controlled by the humidity of air entering space 10 from duct 12. A pump 34 receives water from a water supply 37 and provides pressurized water through a pipe 32 to an adjustable valve 20. Water flows from valve 20 to a nozzle 17 which sprays water into the air stream of duct 12 in a fine mist, raising the humidity thereof. An actuator 22 controls the setting of the valve 20 and the rate at which water flows through valve 20 from pump 34. In our preferred embodiment, operation of actuator 22 is controlled by a humidity demand signal on path 48 which has three states. A first state causes actuator 22 to slowly open valve 20, increasing flow of water to nozzle 17. A second or inactive state causes actuator 22 to hold the setting of valve 20 steady and not change. A third state causes actuator 22 to slowly close valve 20, reducing the flow of water to nozzle 17.

Downstream from nozzle 17, a duct humidity sensor 15 provides a sensor signal which encodes a value $\phi_d$ following the current or actual humidity of the air stream within duct 12. The current humidity sensor technology does not provide reasonably priced sensors which can respond quickly to changes in the air stream humidity within duct 12. Accordingly, the best that can be said for them is that the values which they encode follow the actual humidity according to the standard $$H_{sen}(t_1)=[H-H_{sen}(t_0)](1-e^{-t_1/T})+H_{sen}(t_0)$$

exponential curve, where T is the time constant of the sensor and typically has a value on the order of a few minutes. $t_0$ and $t_1$ are the times at the beginning and end of an interval, H is the actual humidity during the interval and is assumed to be fixed, and $H_{sen}(t_0)$ and $H_{sen}(t_1)$ are the humidity values signalled by the sensor at times $t_0$ and $t_1$ respectively. The humidity of the duct 12 air stream on the other hand can change substantially more quickly, in a matter of a few seconds, in response to opening or closing of valve 20. Suitable relative humidity sensors, both available from the assignee of this application, Honeywell Inc., are Model C7600C for sensor 15 and Model C7600B for sensor 27. Each have a time constant T=2 min. If a periodic measurement is taken such that $H_{sen}(t_0)$ is the previous sensor reading and $H_{sen}(t_1)$ is the current sensor reading then the actual humidity H can be approximated to be: $H=[H_{sen}(t_1)-H_{sen}(t_0)]/(1-e^{-K/T})+H_{sen}(t_0)$.

The value of K is chosen to reflect the sampling period time units conversion and a small anticipation factor. A value of K=1/6 was preferred for an existing commercial implementation of this invention.

A controller 40 operates the actuator 22 by changing the values of the humidity demand signal on path 48 in response to the humidity signals from sensors 15 and 27, so as to maintain the humidity of space 10 close to the space humidity set point carried in a signal encoded on path 43. Typically the space humidity set point will be provided by the installer or by the space occupants if a humidistat is provided for the space. As explained in the Background section above, it is important that the relative humidity of the duct air stream be held to below the dew point (relative humidity of 100%) in order to prevent condensation within duct 12. It is most convenient to include a memory element 50 in which is stored for data retrieval, a maximum duct humidity value. This value may be preset at the factory or set by the installer. There is little to be gained in allowing the occupant or the building environment supervisor to control supply duct humidity.

Controller 40 will typically have overall responsibility for comfort management within space 10, including air conditioning and heating, as well as humidity control. Controller 40 usually comprises a microcontroller of some kind which has stored within it appropriate object code which causes it to provide control signals at its output ports by which the comfort of space 10 is managed. The memory element 50 shown will usually comprise a few memory locations of on-board read only memory (ROM) or perhaps switch settings which form inputs to controller 40.

Figure 2:
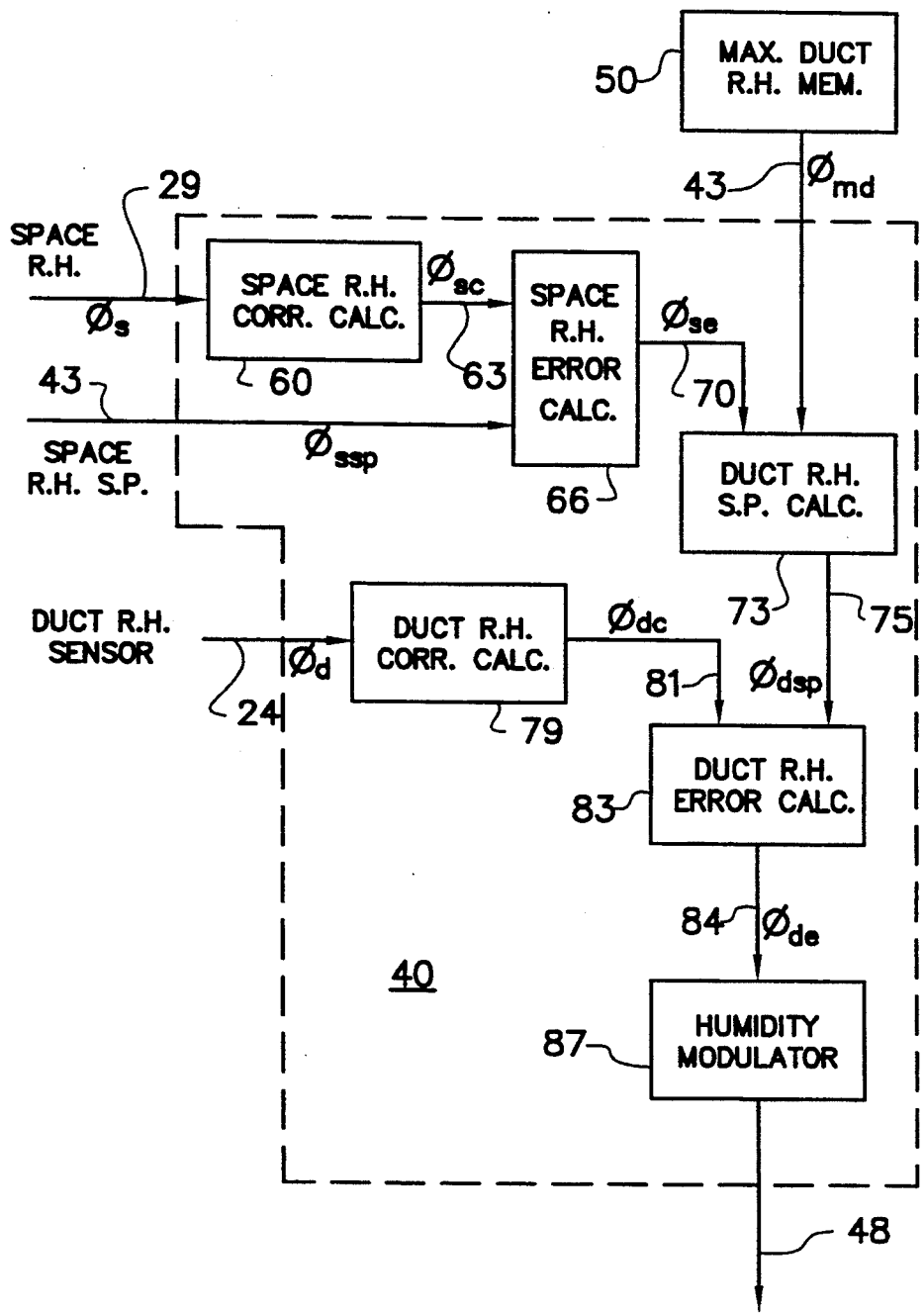
FIG. 2 is block diagram of the control apparatus used by the system of FIG. 1.

FIG. 2 is a block diagram of the operating elements which are created within controller 40 for the purpose of implementing this invention. It is well known of course, that microcontrollers are in fact hardware devices. The object code which causes controller 40 to perform the various functions comprising the elements forming this invention in fact has physical existence within the microcontroller by virtue of being embedded in a physical ROM from which it is extracted as needed by the microcontroller. As the various segments of this object code are executed, each of the elements shown in FIG. 2 come briefly into existence, and then disappear as another segment of code is executed which causes another element to exist. Data is transferred among the various elements by signals which cause data to be stored within either registers of the microcontroller or in Random-Access memory (RAM) associated with the microcontroller. These data storage signals are shown by the various data paths connecting the elements of FIG. 2. While the data paths are shown as separate entities, they of course may be shared among the various other elements, and at different times carry different of the signals shown. While it is of course possible to develop the individual elements and data paths shown in FIG. 2 as dedicated hardware elements, it is so much cheaper to use a microcontroller, both from the standpoint of initial development and when making upgrades and fixing errors, that the hardware-only approach is not favored by those having skill in these arts. Those skilled in these approaches to developing control systems are extremely familiar with small microcontrollers similar to those used in personal computers of all types, and no further notice of this preferred development expedient should be necessary.

To provide the public with the means to most effectively practice this invention, the object code used here in the commercial embodiment is not presented. Instead the actual pseudocode from which was developed the source code and then the object code used in an operating commercial embodiment of the invention is included in Table I below. Those having commonly available programming skills will be able to develop their own versions of the necessary source code from which the object code for implementing the invention may be produced.

In FIG. 2, controller 40 is shown as including an element 60 which performs a prediction or correction calculation using as an independent variable the space relative humidity $\phi_s$ value encoded in the signal on path 29 from sensor 27. This calculation yields a value $\phi_{sc}$ for space humidity compensated for the lag in response inherent in sensor 27. $\phi_{sc}$ is encoded in the signal carried on path 63. The preferred correction formula is disclosed in the discussion below of the pseudocode in Table I. A similar calculation is used by element 79 to provide a corrected duct humidity value $\phi_{dc}$ carried on 81.

Element 66 performs a calculation for space relative humidity error $\phi_{se} = \phi_{ssp} - \phi_{sc}$ and encodes $\phi_{se}$ in the signal on path 70. Element 73 receives the space humidity error $\phi_{se}$ and the maximum duct humidity $\phi_{md}$ carried on path 43 and supplied by memory element 50, and calculates a duct set point humidity $\phi_{dsp}$ as a function of $\phi_{se}$ and $\phi_{md}$ and encoded in the signal on path 75. The preferred algorithm for determining $\phi_{dsp}$ is set forth in Table I below.

The corrected duct humidity value $\phi_{dc}$ encoded in the signal on path 81 and the duct humidity set point $\phi_{dsp}$ encoded on path 75 are inputs to a calculator element 83 which forms the duct humidity error $\phi_{de}$ as $\phi_{dsp} - \phi_{dc}$ and encodes $\phi_{de}$ in the duct humidity error signal on path 84. A modulator element 87 receives the duct humidity error signal on path 84 and determines the amount of change in the rate at which water is added to the air stream in duct 12. This is accomplished by controlling the time during which actuator 22 opens or closes valve 20.

The controller 40 typically will have a number of other functions to perform in addition to space humidity control. Examples of these functions might be space temperature control, energy management, etc. Individual functions are executed under control of a scheduler which operates in real time in an endless control loop. The microcontroller which comprises controller 40 includes some type of timing function by which the passing of time may be measured and detected. When the time arrives to execute a particular function, the scheduler instructions transfer operation to the instruction for that function. When the instructions for that function have been executed, instruction execution is transferred back to the scheduler. This is a well known means of operating a process in real time, and no further note of it should be needed.

In Table I, the number in parentheses at the beginning of each individual pseudocode statement will be used in the discussion of Tables I to identify that statement. Comments and explanations are not numbered. It is assumed that the object code which is developed from the pseudocode of Table I will for the most part be executed every 15 sec., as implied by the parenthetical comment in the title of Table I. However, the actual control of the position of the valve 20 by actuator 22 in the pseudocode of Table I occurs by the execution of object code developed from statements 40–53 and which is executed every ½ second. Table II immediately following Table I briefly defines each variable used in Table I, although in most cases the definition is obvious. Humidity values all have percent relative humidity as their dimension.

TABLE I

Modulation Control Routine (15 sec loop)

\* Calculate Corrected Humidity Values (predictions based on change in sensor)\*
(1) pred_duct_rh =
  [(sen_duct - sen_duct_old)/(1 − e^{−1/6T}d)] +
  sen_duct_old
(2) sen_duct_old = sen_duct
(3) pred_room_rh =
  [(sen_room - sen_room_old)/(1 − e^{−1/6T}r)] +
  sen_room_old
(4) sen_room_old = sen_room \* Room Humidity Control (duct set point reset calculation)\*
(10) room_err = room_sp - pred_room_rh
(11) duct_err = duct_sp - pred_duct_rh
(12) if( abs(room_err) < 4 AND
  abs(duct_err) < 2 then
(13)   room_intgrl = room_intgrl + room_err/32
(14)   limit room_intgrl to ± 4
(15) else
(16)   room_intgrl = 0
(17) endif
(18) duct_sp = pred_duct_rh + room_err/2 + room_intgrl
(19) limit duct_sp (low_prog_limit ≦ duct_sp ≦ duct_limit)

\* Duct Humidity Control (floating output)\*
(20) error = duct_sp - pred_duct_rh
(21) index = integer[abs (2 × error/3)] + 1
(22) if index > 9 then
(23)   index = 9
(24) endif
(25) if abs(error) < 1 then
(26)   exit
(27) else
(28)   if error < 0 then
(29)     nclose = runtable(index)
(30)   else
(31)     nopen = runtable(index)
(32)   endif
(33) endif
(34) exit \*Floating Actuator Control (½ sec loop)\*
(40) if nclose > 0 then
(41)   relay_close_output = true
(42)   dec nclose
(43)   exit
(44) else
(45)   relay_close_output = false
(46) endif
(47) if nopen > 0 then
(48)   relay_open_output = true
(49)   dec nopen
(50) else
(51)   relay_open_output = false
(52) endif
(53) exit

TABLE II pred_duct_rh — Corrected (predicted) duct humidity $\phi_{dc}$
sen_duct — Humidity value encoded in current duct sensor signal $\phi_d$
sen_duct_old — Humidity value encoded in previous duct sensor signal $\phi_d$
$T_d$ — Time constant for duct sensor (minutes)
$T_r$ — Time constant for room sensor (minutes)
pred_room_rh — Corrected (predicted) space humidity $\phi_{sc}$
sen_room — Humidity value encoded in current space sensor signal $\phi_s$
sen_room_old — Humidity value encoded in previous space sensor signal $\phi_s$
room_err — Space relative humidity error $\phi_{se}$
duct_err — Duct relative humidity error $\phi_{dc}$
room_intgl — Time integral of the space relative humidity error
duct_sp — Calculated set point for the duct relative humidity
low_prog_limit — Minimum allowable value for duct_sp
duct_limit — Maximum allowable value for duct_sp $\phi_{md}$
error — Duct relative humidity error using newly calculated duct set point $\phi_{dsp}$

TABLE II-continued index — Index for selecting operating time entry from the run table
nclose — Time in half seconds to drive humidity control valve closed
nopen — Time in half seconds to drive humidity control valve open Executing object code developed from statements 1 and 2 causes controller 40 to comprise calculation element 60 which performs the calculations for a new corrected value for space humidity. The internal microcontroller signals generated by the last instructions of this object code encode a digital value of the corrected space humidity signal $\phi_{sc}$ carried on path 63 of FIG. 2. Executing object code developed from statements 3 and 4 causes controller 40 to comprise calculation element 79 which performs the calculations for a new corrected value for duct humidity. The signal generated by the last of this object code comprise a digital value of the corrected space humidity signal $\phi_{dc}$ carried on path 81 of FIG. 2. The assumption that each of the humidity sensors 15 and 27 responds according to an exponential decay approximation allows an improved prediction of the actual humidity. The prediction calculation for space relative humidity is substantially less important than that for duct relative humidity as far as accurate control of space humidity is concerned.

Executing object code developed from statement 10 causes controller 40 to comprise calculation element 66, which calculates space humidity error as the difference between the space humidity set point encoded in the signal on path 43 and the newly calculated corrected space humidity value. The space humidity error $\phi_{se}$ is encoded as the signal on path 70. duct humidity error based on the newly calculated duct humidity prediction.

When the object code derived from statements 12–18 along with statement 19 is executed, controller 40 comprises calculator element 73 of FIG. 2. The object code from statements 12–18 defines the calculation of a new duct humidity set point $\phi_{dsp}$ as a function of the newly calculated space humidity error room_err or $\phi_{se}$, as well as of the current predicted duct humidity. Note that the value of the intermediate room_intgrl variable is itself a function of room_err. (The operator "abs" shown in statement 12 means "absolute value of" room_err or duct_err.) The limits imposed on room_intgrl in statement 12 are intended to make the computation of The limitations on the magnitude of room_err and duct_err in statement 12 are arbitrary, and can be chosen to provide suitable damping of the control algorithm. Those skilled in the art will have no trouble understanding the mathematical operations implied by statements 12–18 and developing their own source and object codes from the pseudocode.

The object code derived from statement 19 when executed, defines the range allowed for the duct humidity set point duct_sp ($\phi_{dsp}$) as between the minimum values selected for the duct humidity and represented by variables low_prog_limit and duct_limit ($\phi_{md}$). If $\phi_{dsp}$ is outside these limits, $\phi_{dsp}$ is set to the limit involved. These values will normally be fixed before the system is placed in operation, typically by the factory or the installer. The more important of value is maximum duct_limit $\phi_{md}$, which must be set low enough to prevent condensation in duct 12. After the object code of statement 19 has been executed, execution continues with the object code of statement 20.

When the object code which can be derived from statement 20 is executed, controller 40 comprises calculator element 83 shown in FIG. 2. Statement 20 object code/element 83 computes the duct humidity error $\phi_{de} = \phi_{dsp} - \phi_{dc}$, on which is based the change required in the setting of valve 20. $\phi_{de}$ is encoded in the humidity demand signal carried on path 84.

Executing the object code derived from statements 21–34 and 40–53 causes controller to comprise the humidity modulator of FIG. 2. The object code developed from statements 21–23 when executed, causes controller 40 to compute an index value specifying an entry in a run time table, Table III below. Each entry in the run time table contains a run time during which valve 20 is further opened or closed an incremental amount.

TABLE III

| Index | Run Time |
|-------|----------|
| 1 | 0 |
| 2 | 1 |
| 3 | 1 |
| 4 | 1 |
| 5 | 2 |
| 6 | 2 |
| 7 | 4 |
| 8 | 7 |
| 9 | 20 |

A preliminary value for the index is computed by the object code of statement 21 as the largest integer smaller than $1 + |(\frac{8}{3})\phi_{de}|$. The code from statements 22–24 then limits the maximum index value to 9. The various coefficients specified in statements 21–23 should be selected according to the operating parameters of the system to be actual controlled.

Statements 25 and 26 specify object code which tests the absolute value of the duct humidity error $\phi_{de}$, and if less than 1, causes an exit back to the scheduler.

If the actual value of the error $\phi_{de}$ is less than 0, then the nclose variable is set to the value in the run time table for the index value computed by executing the object code for statements 21–24. For example, if the index computed by statements 21–24 is 5, nclose is set to 2. If the actual value of the error $\phi_{de}$ is greater than 0, then the nopen variable is set to the value in the run time table for the index value computed by executing the object code for statements 21–24. For example, if the index computed by statements 21–24 is 7, nopen is set to 4. By this process one of nclose and nopen may be set to a positive nonzero value which specifies the number of half seconds the actuator 22 should operate to open or close valve 20. After the nclose or nopen variable has been set to an operating interval, the exit function of statement 34's object code is performed.

There are now generally available actuators with two types of response interfaces which are suitable for use as actuator 22. The response of the first type is based on which one of three different values the humidity demand signal supplied to it has, and this is the type which actuator 22 has been assumed to be. It has already been explained that when a first, second, or third value of the humidity demand signal is supplied to an acutator 22 of the first type, actuator 22 respectively opens, holds fixed, or closes valve 20. While changing position, an actuator of the first type opens and closes valve 20 at a steady rate. This invention can operate effectively with actuators of the second type also. These actuators accept an analog voltage or current input whose magnitude specifies the correct output shaft position. A voltage or current within the design control range causes the actuator to drive at a constant speed to a position which represents the same percentage of angular excursion in the range as does the input voltage or current level within its demand control range. However, because it is necessary to convert the digitally encoded error value to an analog current or voltage specifying the actuator position, and because the second type of actuator is somewhat more expensive, the currently preferred embodiment of this invention is one which is adapted to function with the first type of actuator. Where the second type of actuator is already installed in a system to which this invention is to be retrofitted, it makes economic sense to adapt the invention to function with it.

Object code derived from statements 40–53 allows controller 40 to function with the first type of actuator, and this will be presented as the preferred embodiment for this function of the invention. These statements define object code which converts controller 40 to function as humidity modulator 87. The object code for statements 40–53 is executed once each half second by the scheduler, as parenthetically indicated in the title of this pseudocode.

Object code for statements 40–46 deals with the situation where the duct humidity error signal ($\phi_{de}$) requires a decrease in duct humidity, which is signified by a non-zero nclose variable. The object code from statement 41 is executed when nclose is greater than 0. This statement 41 object code causes controller 40 to issue a humidity demand signal having its third value on path 48 which causes the actuator 22 to close valve 20 at a predetermined rate. Statement 42 reduces the value of the nclose by 1 and then the object code corresponding to the exit command of statement 43 returns control to the scheduler. If nclose=0 was true when the statement 40 object code was executed, then the statement 40 object code transferred execution to statement 45's object code, causing the humidity demand signal to enter its second or inactive state.

After the object code of statements 40–46 has been executed, and if there was not an exit back to the scheduler, the object code for statements 47–52 is executed. The object code for statement 47 tests the nopen variable and if greater than 0 allows the object code for statement 48 to cause controller 40 to set the humidity demand signal on path 48 to its first value. While the first value of the humidity demand signal exists, actuator 22 slowly opens valve 20, increasing the rate at which water is added to the air stream in duct 12. The object code of statement 49 causes controller 40 to decrement the value of the nopen variable by 1. If statement 47's object code cause controller 40 to sense nopen=0, then the statement 51 object code causes controller 40 to set the humidity demand signal to its second or inactive state. The exit object code of statement 53 returns instruction execution to the scheduler.

It can be seen that by executing the object code of statements 40–53, the humidity demand signal is set to its first or third value for as long as the associated nclose or nopen variable's value specifies. In this way, the rate at which water is added to the air stream in duct 12 can be changed dependent on the error in the duct humidity $\phi_{de}$. The duct humidity set point is functionally dependent on the error in the space humidity $\phi_{se}$ in a way which allows $\phi_{se}$ to be decreased as much as is possible without saturating the air stream in duct 12. The result is that the humidity of space 10 is held as close to the desired value as is possible with the humidification control equipment provided for the installation, consistent with a healthy environment and long life for the equipment.

The preceding describes my invention and allows those skilled in the art to practice it. What I claim and desire to protect by Letters Patent is:

1. Apparatus for controlling humidity in a space including a humidity sensor providing a space humidity signal encoding a value representing the space humidity and receiving air from a duct, said duct including humidity control apparatus for variably changing the humidity of the air passing through the duct to a level which is a function of the value encoded in a humidity demand signal, comprising a) a duct humidity sensor having i) a sensing element mounted in the duct and providing a sensor signal encoding a sensor value following the current duct humidity, and ii) duct humidity signal means receiving the sensor signal, for providing a duct humidity signal encoding a duct humidity value dependent on the sensor value and approximating the current value of the duct humidity;

b) a first calculator means recording a space humidity set point value and receiving the space humidity signal, for providing a space humidity error signal encoding a space humidity error value equal to the difference between the space humidity value and the space humidity set point value;

c) a memory means for issuing a duct humidity limit signal encoding a preselected maximum duct humidity value;

d) a second calculator means receiving the space humidity error signal and the duct humidity limit signal, for calculating a duct humidity set point value as a function of the space humidity error value, and less than the duct humidity maximum value, and for issuing a duct humidity set point signal encoding the duct humidity set point value; and e) modulator means receiving the duct humidity set point signal and the duct humidity signal, for providing a humidity demand signal having a value responsive to the difference between the duct humidity set point value and the duct humidity value encoded in the duct humidity signal.

2. The humidity control apparatus of claim 1, wherein the duct humidity signal means includes correction means receiving the sensor signal, for calculating a corrected current duct humidity value, and for issuing a duct humidity signal encoding the corrected current duct humidity value.

3. The humidity control apparatus of claim 2, wherein the correction means includes memory means receiving the sensor signal, for periodically recording the sensor value encoded in the sensor signal, and means accessing the recorded sensor values for calculating as the corrected current duct humidity value, a value following the difference between the sensor value recorded in the current sensor signal and a previously recorded sensor value.

4. The humidity control apparatus of claim 3, wherein the correction means further comprises means for calculating as the corrected current duct humidity value, a value equal to the product of a factor dependent on a time constant for the sensor, and the difference between the sensor value recorded in the current sensor signal and the most recently previously recorded sensor value.

5. The humidity control apparatus of claim 3, wherein the correction means further comprises means for calculating as the corrected current duct humidity value, a value equal to the product of a factor equal to $1/(1-e^{-K/T})$ and the difference between the sensor value recorded in the current sensor signal and the most recently previously recorded sensor value, wherein K is a scale factor value and T is a time constant value for the sensor.

6. The humidity control apparatus of claim 5, wherein K equals approximately 1/6.

7. The humidity control apparatus of claim 3, wherein the humidity control apparatus is of the type which continuously increases the rate at which water is injected into the air passing through the duct responsive to a first value of the humidity demand signal, holds constant the amount of water injected into the air passing through the duct responsive to a second value of the humidity demand signal, and reduces the rate at which water is injected into the air passing through the duct responsive to a third value of the humidity demand signal, and wherein the modulation means further comprises means receiving the duct humidity signal for further controlling the durations of the humidity demand signal values as a function of the duct humidity value.

8. The humidity control apparatus of claim 1, wherein the humidity control apparatus is of the type which continuously increases the rate at which water is injected into the air passing through the duct responsive to a first value of the humidity demand signal, holds constant the rate at which water is injected into the air passing through the duct responsive to a second value of the humidity demand signal, and reduces the rate at which water is injected into the air passing through the duct responsive to a third value of the humidity signal, and wherein the modulation means further comprises means receiving the duct humidity signal for further controlling the durations of the humidity demand signal values as a function of the duct humidity value.

9. The humidity control apparatus of claim 8, wherein the modulation means further comprises means for calculating a duct humidity error value as the difference between the duct humidity set point and the duct humidity value, and for issuing the humidity demand signal with values whose durations depend on the duct humidity error value.

10. The humidity control apparatus of claim 9, wherein the modulation means further comprises index means receiving the duct humidity error value, for calculating a run time index as a function of the duct humidity error value, table storage means for recording a run time table having a plurality of run time entries, each entry retrievable by entering the run time table with the run time index, and run time means receiving the run time index, for entering the run time table with the run time index and retrieving the run time entry associated with the current value of the run time index, and for issuing the humidity demand signal with durations of one of the first and third values equalling the most recently retrieved run time entry.

* * * * *